No. 688,515. Patented Dec. 10, 1901.
B. M. W. HANSON.
METAL WORKING MACHINE.
(Application filed Nov. 12, 1900.)
(No Model.) 7 Sheets—Sheet 1.

Witnesses: Inventor
B. M. W. Hanson
By Atty.

No. 688,515. Patented Dec. 10, 1901.
B. M. W. HANSON.
METAL WORKING MACHINE.
(Application filed Nov. 12, 1900.)

(No Model.) 7 Sheets—Sheet 3.

Witnesses:
H. Mallour
Jos. Merritt

Inventor
B. M. W. Hanson
By Wm H Honiss, Atty.

THE NORRIS PETERS CO., PHOTO-LITHO., WASHINGTON, D. C.

No. 688,515. Patented Dec. 10, 1901.
B. M. W. HANSON.
METAL WORKING MACHINE.
(Application filed Nov. 12, 1900.)

(No Model.) 7 Sheets—Sheet 4.

Witnesses: Inventor
B. M. W. Hanson
By Wm H Honiss Atty.

No. 688,515.  
B. M. W. HANSON.  
METAL WORKING MACHINE.  
(Application filed Nov. 12, 1900.)  
Patented Dec. 10, 1901.

(No Model.)

7 Sheets—Sheet 5.

Witnesses:  
H. Mallner  
Job. Merritt

Inventor  
B. M. W. Hanson  
By Wm H Honiss, Atty.

No. 688,515.  
Patented Dec. 10, 1901.  
B. M. W. HANSON.  
METAL WORKING MACHINE.  
(Application filed Nov. 12, 1900.)  
(No Model.)  
7 Sheets—Sheet 6.

Witnesses:  
H. Mallan  
Jos. Merritt

Inventor  
B. M. W. Hanson  
By Wm H Honiss, Atty.

THE NORRIS PETERS CO., PHOTO-LITHO., WASHINGTON, D. C.

No. 688,515. Patented Dec. 10, 1901.
B. M. W. HANSON.
METAL WORKING MACHINE.
(Application filed Nov. 12, 1900.)

(No Model.) 7 Sheets—Sheet 7.

Witnesses:
H. Mallner
Jos. Merritt

Inventor
B. M. W. Hanson
By Wm H Honiss, Att'y.

THE NORRIS PETERS CO., PHOTO-LITHO., WASHINGTON, D. C.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-WORKING MACHINE.

SPECIFICATION forming part of Letters Patent No. 688,515, dated December 10, 1901.

Application filed November 12, 1900. Serial No. 36,205. (No model.)

*To all whom it may concern:*

Be it known that I, BENGT M. W. HANSON, a subject of the King of Sweden and Norway, and a resident of Hartford, in the county of Hartford and State of Connecticut, have invented certain new and useful Improvements in Metal-Working Machines, of which the following is a specification.

This invention relates to an improved apparatus for milling away the spaces between the adjacent teeth of the taps or dies and similar tools of various kinds and forms, the object being to provide a highly-organized and improved automatic machine which shall be efficient, accurate, and rapid in its operation.

This invention, as herein shown and described, is embodied in a machine adapted for milling the threads of a screw-cutting tap having a parallel-sided body and a tapering end.

Figure 1:
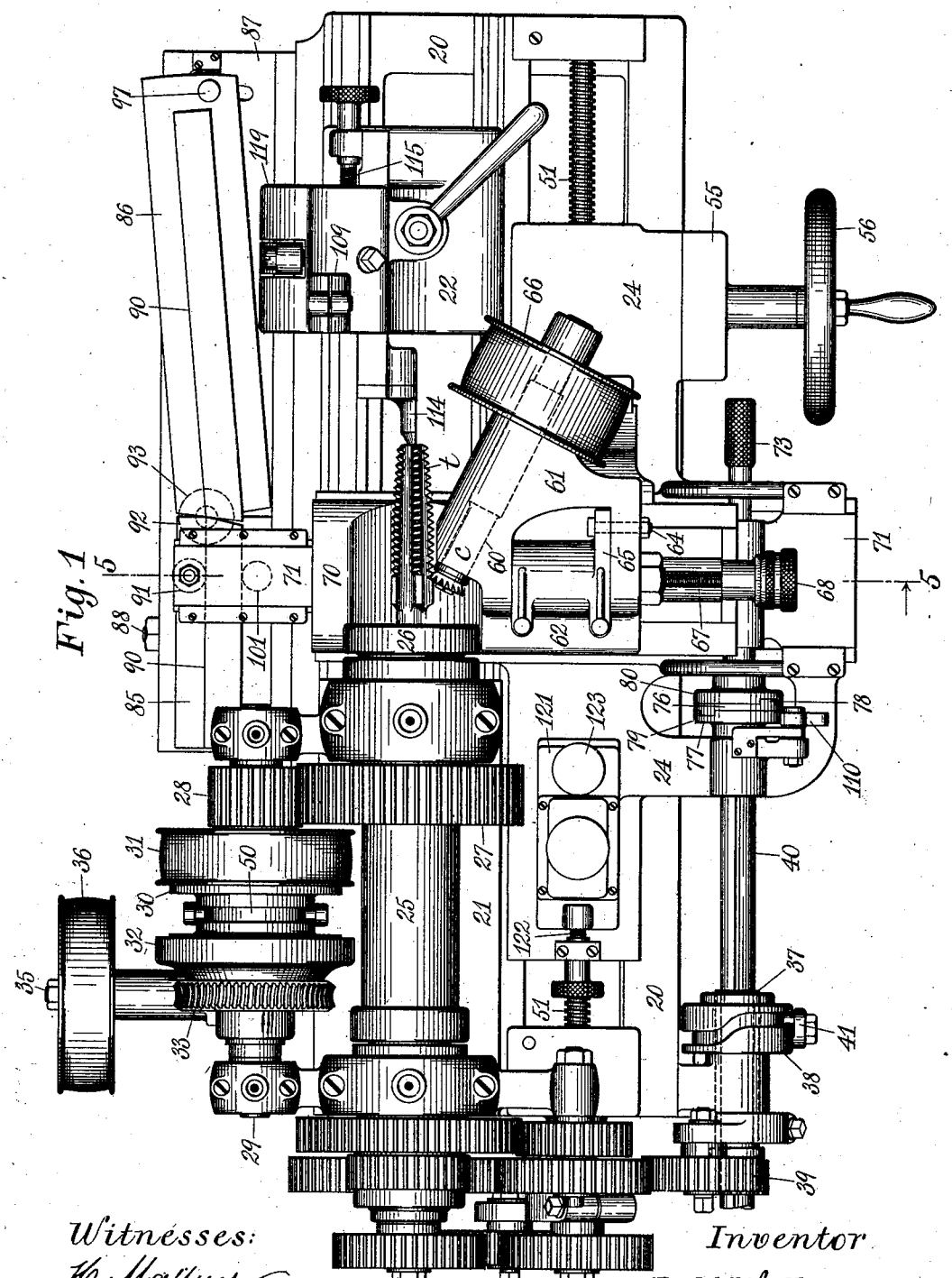
Figure 2:
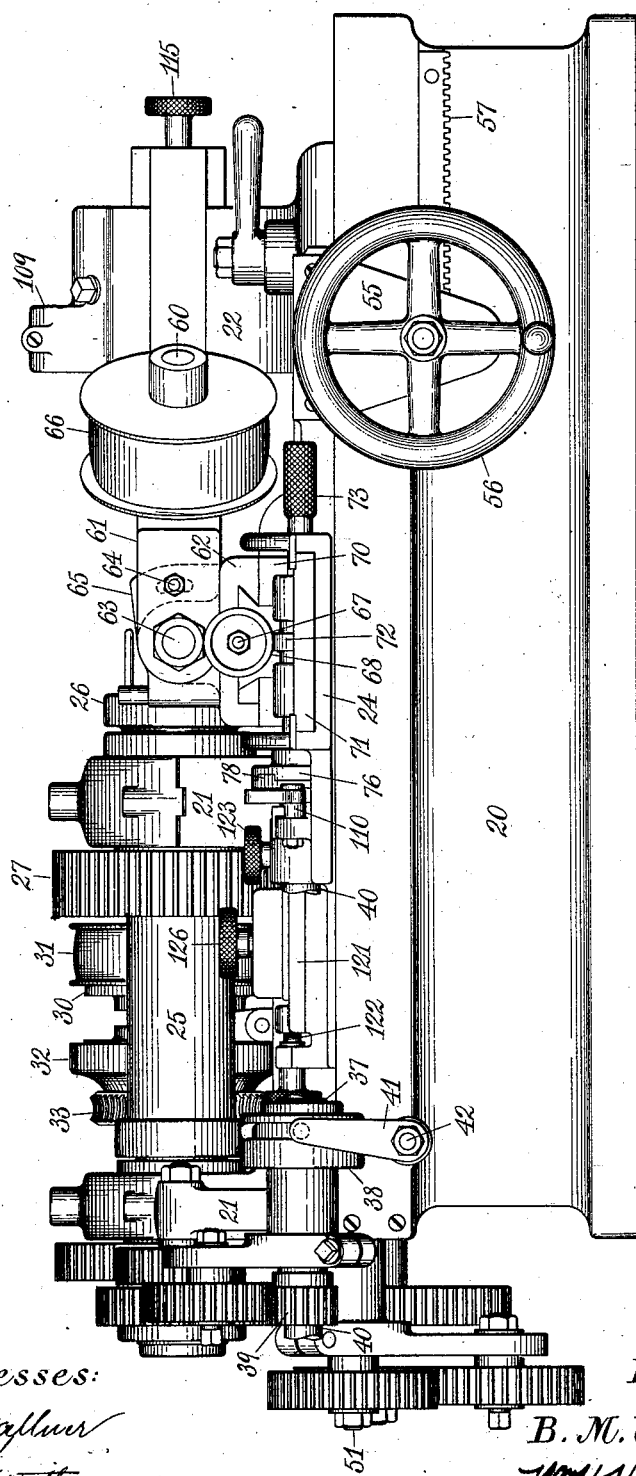
Figure 3:
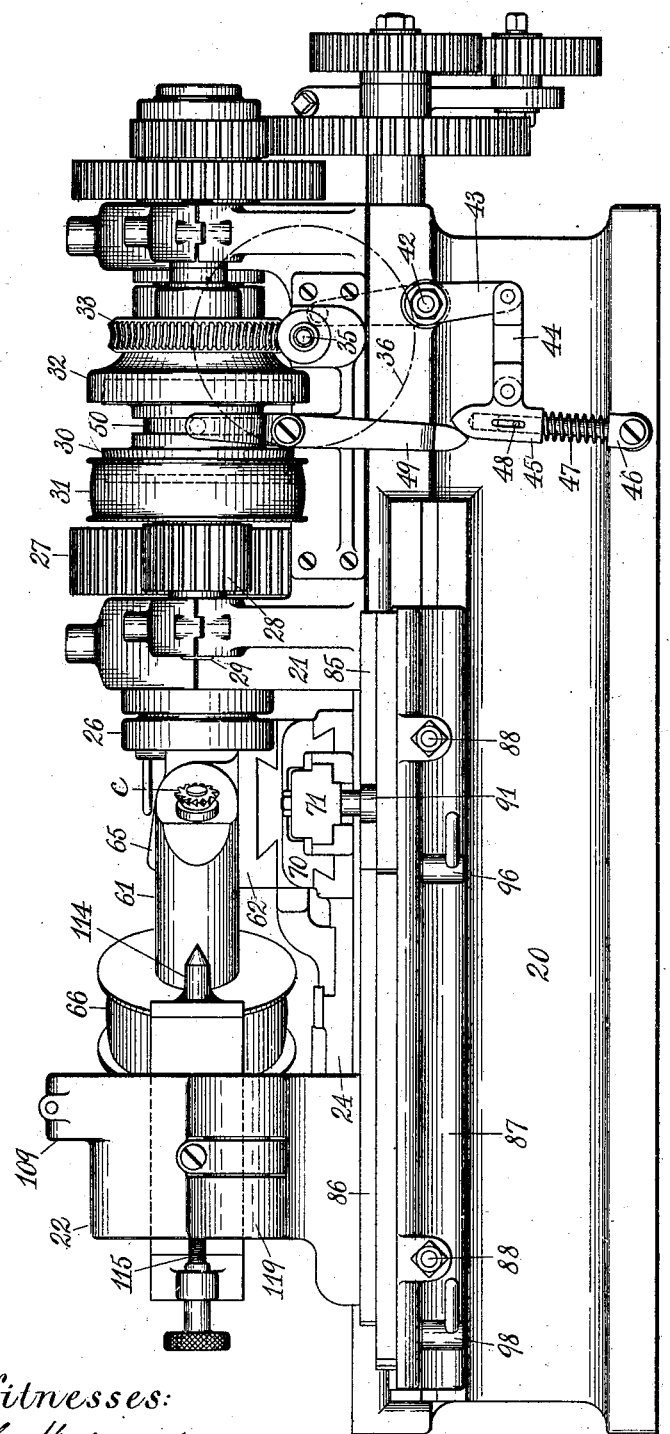
Figure 4:
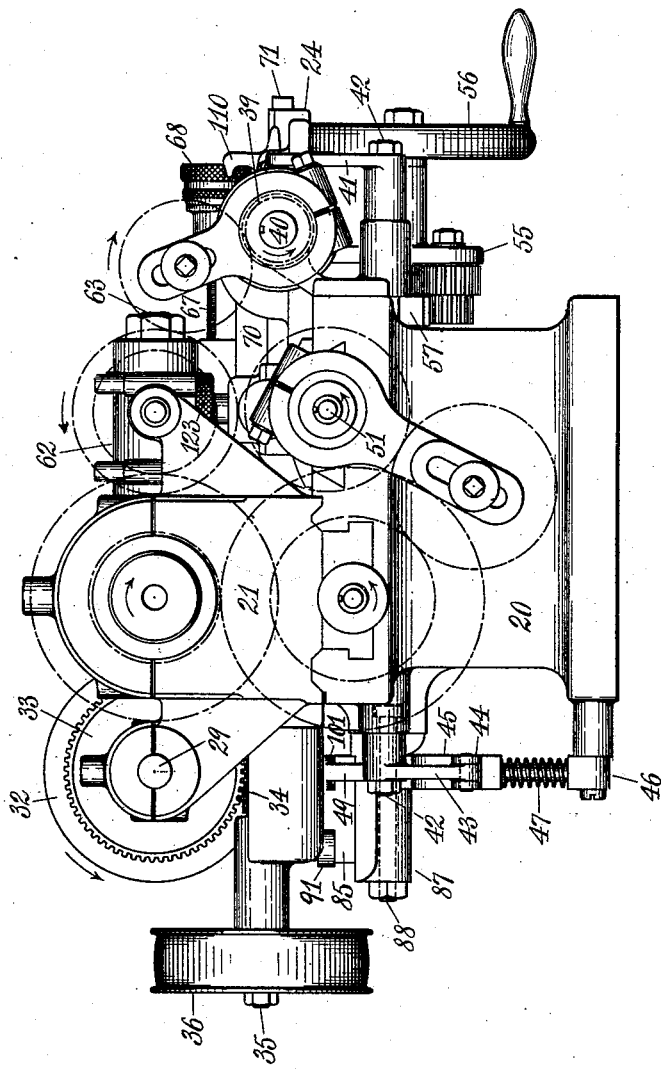
Figure 5:
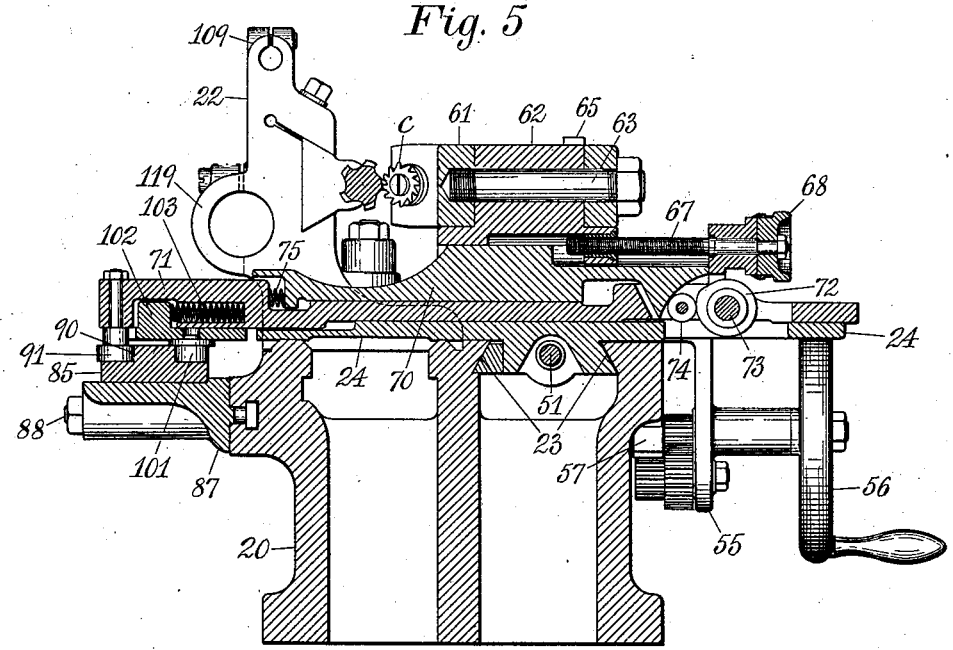
Figure 6:
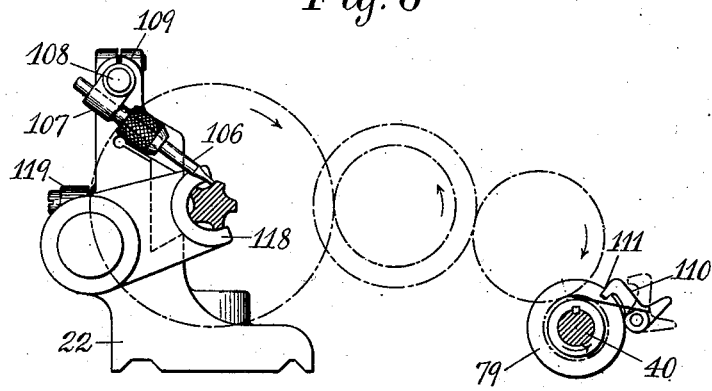
Figure 7:
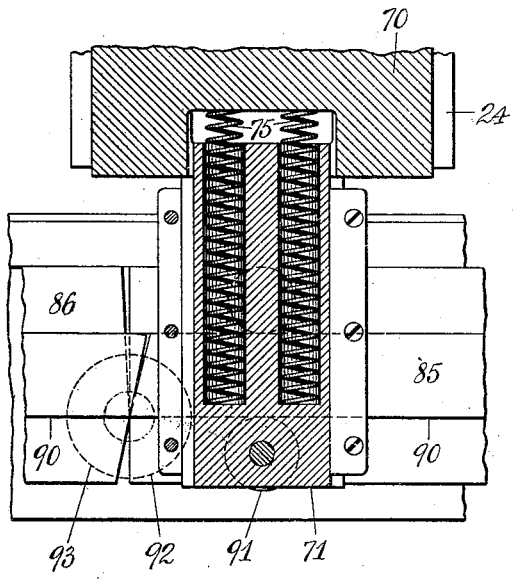
Figure 10:
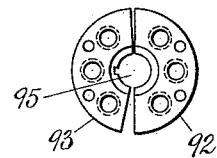
Figure 11:
Figure 8:
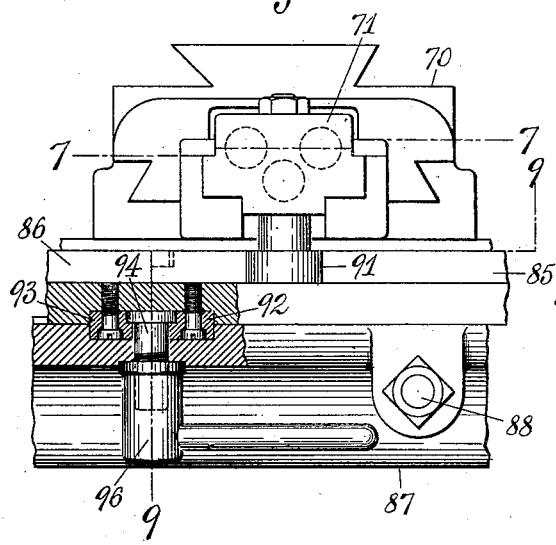
Figure 9:
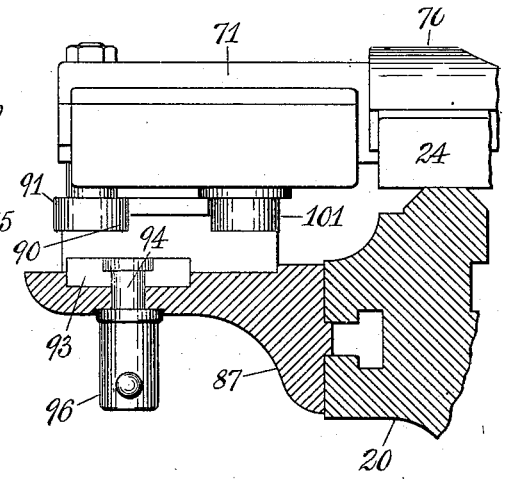
Figure 12:
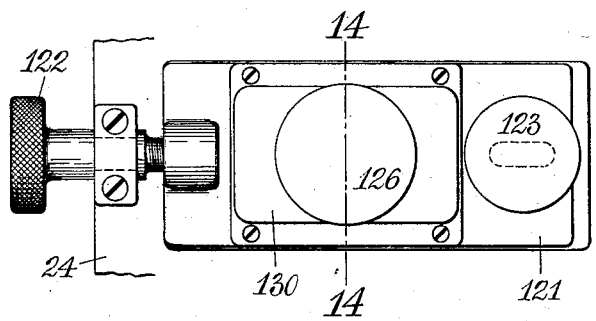
Figure 14:
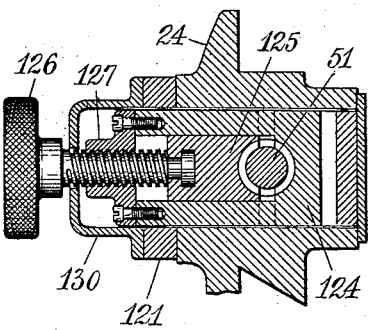
Figure 13:
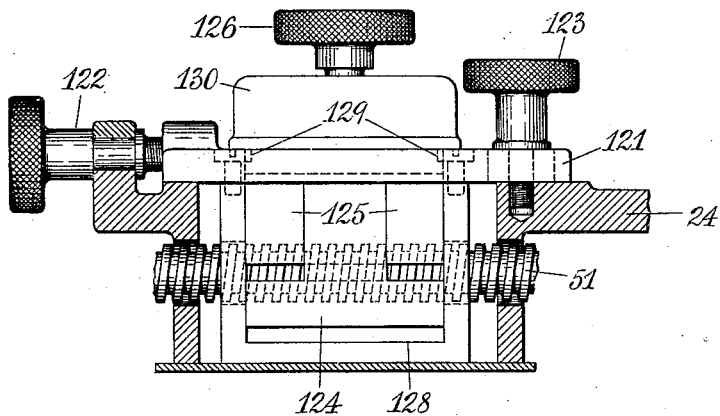
Figure 15:
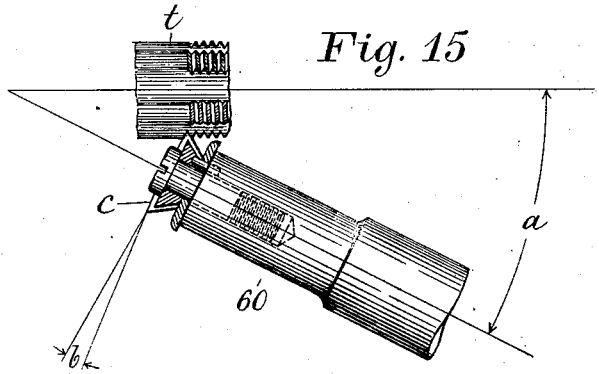

Figure 1 of the drawings is a plan view of this machine. Fig. 2 is a front view, and Fig. 3 a rearward view projected from Figs. 1 and 2. Fig. 4 is a view of the left-hand end of the machine as viewed in Figs. 1 and 2. Fig. 5 is an end view in section taken substantially along the line 5 5 of Fig. 1. Fig. 6 is a diagrammatic view illustrating the method of setting the tap-blank in correct relation to the relieving-cam. Fig. 7 is a plan view, Fig. 8 is a rearward view, and Fig. 9 an end view showing in enlarged scale the construction and arrangement of the jointed guide-bar, Fig. 7 being a section taken substantially along the line 7 7 of Fig. 8, while in Fig. 9 a portion thereof is shown in section taken along the line 9 of Fig. 8. In Fig. 8 the joint of the bar is shown in section taken through the vertical plane of its center. Fig. 10 is a plan view, and Fig. 11 a side view, showing the details of the joint for connecting the hinged and adjustable members of the guide-bar. Fig. 12 is a plan view, Fig. 13 a front view, and Fig. 14 an end view, of the device for connecting and disconnecting the carriage to and from the lead-screw and for adjusting the carriage longitudinally with relation to the screw. In Fig. 13 the carriage is shown in section taken vertically along the plane of the axis of the lead-screw, and Fig. 14 is drawn in transverse section taken along the line 14 14 of Fig. 12. Fig. 15 is a plan view of the cutter and its spindle, showing their angular relation to each other and to the work.

The machine herein shown and described is of a type similar to that of the well-known engine-lathe, having a bed 20, provided with a head-stock 21 and a foot-stock 22. This bed is provided with ways 23, upon which the tool-carriage 24 is fitted to slide longitudinally of the bed. The head-stock 21 is provided with a work-spindle 25, having a chuck 26 of suitable construction for gripping the work, which is herein shown to be a tap $t$. The spindle is connected by means of gearing with a lead-screw 51, by means of which the carriage is moved longitudinally of the bed in a suitable relation to the rotations of the main spindle, so as to produce the required spiral upon the periphery of the tap. As the carriage is thus advanced a rotating milling-cutter mounted upon the carriage cuts away the intervals between the teeth, following from wing to wing of the slowly-rotating tap the spiral in which the teeth thereof are to be located.

In order to produce the contours required upon the different forms of work, the milling-cutter is not mounted directly upon the carriage 24; but two intervening slides are provided, both of which are movable laterally of the work. One of these slides may be moved under the control of an adjustable guide-bar upon the rearward side of the machine, which determines the longitudinal contour of the sides of the work. The other slide, which is movable upon the taper controlling-slide, is also moved transversely of the work under the control of a rotating cam which determines the peripheral contour of the work and which, as herein illustrated, is employed to impart a "relief" or clearance to the teeth of the tap $t$. Thus the rotating milling-cutter having been set to its proper depth may be moved longitudinally of the work $t$ under the control of the guide-bar or of the relieving-cam, or both, the work being rotated at a suitable rate, constituting the feeding movement.

In order to economize time in the milling of an interrupted surface like that of a fluted tap-blank, it is desirable to provide the spindle 25 with at least two different speeds, the slower of which is employed while the milling-cutter is at work upon each wing of the tap. The other speed, which may be very much faster, is employed to rotate the tap more rapidly to carry the fluted interval quickly past the cutter and bring the next wing into engagement therewith. The spindle 25 has fixed upon it the gear 27, which meshes with a pinion 28 upon the clutch-shaft 29, mounted in brackets upon the head-stock. The shaft 29 is provided with the clutch 30, which is splined upon the shaft and movable longitudinally thereof to an extent sufficient to enable it to engage with and be driven by the faster pulley 31 or the slower disk 32, both of which rotate freely upon the shaft 29 excepting when engaged by the clutch 30. The disk 32 has fixed upon it the worm-wheel 33, driven by the worm 34 on the shaft 35, which has fixed upon it the pulley 36. The pulleys 31 and 36 are driven from any convenient counter-shaft at suitable speeds for imparting the desired rate of feed to the rotating work. The operations of the clutch 30 are controlled by the cam 38 on the sleeve 37, which engages with the arm 41 on the rock-shaft 42, mounted transversely in the bed 20. At its rearward end the shaft is provided with an arm 43, which is connected by means of the link 44 with the clutch-actuating device. (Best shown in Fig. 3.) Inasmuch as the clutch 30 is the medium whereby movement is communicated to all parts of the machine, including the clutch-operating device itself, it is obvious that the machine will stop as soon as the clutch 30 is withdrawn from the pulley 31 or the disk 32 by the operation of the cam 38 and before the latter will have moved the clutch into engagement with the opposite driving member. Therefore means must be provided independently of its own continued movement for carrying the clutch 30 from the disk 32 to the pulley 31, and vice versa; hence the provision shown in Fig. 3. This consists of a plunger 45, which is fitted to slide longitudinally upon the arm 46, pivotally mounted upon the bed 20. A spring 47 is interposed between the pivot of the arm and the plunger 45 to press the latter outwardly to the position shown in Fig. 3 against a suitable stop 48. The upper end of this plunger is beveled or inclined upon both sides and engages with a similarly-shaped end of the clutch-lever 49, which is pivotally mounted upon the head-stock and has the usual forked extensions for engaging with an annular groove 50 of the clutch 30. When it is desired to move the clutch from the position shown in that figure, the plunger 45 is moved toward the left by the cam 38, the inclined engaging ends of the plunger and the clutch-lever 49 causing the former to slide inwardly toward the pivot of its arm 46 against the pressure of the spring 47 until the end of the plunger passes by the end of the clutch-lever, when the spring forces the plunger up on the opposite or left side of that lever, thereby forcing it toward the right and carrying the clutch away from the disk 32 into engagement with the pulley 31, where it remains until the interval between the wings of the taps has been fed past the cutter and the succeeding wing nearly brought into engagement therewith, when the cam 38 moves the plunger 45 back to the position shown in Fig. 3, thereby again bringing into operation the slower feed. Thus by the operation of its cam 38 the clutch may be moved into driving engagement with the faster pulley 31 or with the slower worm-wheel disk 32, being herein shown in engagement with the latter, so as to drive the work-spindle 25 at the slower of the two feeds, the cutter being shown in the operation of milling across one of the wings of the tap $t$. As soon as the wing has left the cutter the clutch is moved by the cam 38, so as to carry the interval or flute between the wings rapidly past the cutter and bring the succeeding wing into engagement.

The cam-sleeve 37 is provided with a pinion 39, which is connected by gearing, as best shown in Figs. 1, 4, and 6, with the main spindle 25. In order to enable the machine to operate upon the taps and similar work having different numbers of wings, suitable change-gears are provided and are employed exactly like the change-gears of the ordinary engine-lathe. The lead-screw 51 is similarly geared from the main spindle, as indicated by the dot-and-dash pitch-circles in Fig. 4, the changes in pitch of the taps being made by the use of change-gears, as above described, in connection with the cam-sleeve 37. The lead-screw is mounted at its ends in the bed 20 and engages with the tool-carriage 24 by means of a detachable and adjustable nut, (illustrated in Figs. 12, 13, and 14,) the details of which will be hereinafter fully described. The carriage 24 is provided with an apron 55, which carries a hand-wheel 56, connected by suitable gearing with a rack 57, fixed to the bed 20, whereby the carriage may readily be detached from its lead-screw 51 and be moved by hand longitudinally of the bed.

The milling-cutter $c$ is fixed upon or integral with a cutter-spindle 60, which is mounted to rotate in a swinging bracket 61, pivotally mounted upon the cross feed-slide, as best shown in Fig. 5, the axis of oscillation being in the plane of the work-spindle. This is to enable the plane of the milling-cutter to be adjusted to the angle of the spiral to be cut. The bracket is mounted upon the pivot-shaft 63, which is supported by the cross feed-slide 62, and the bracket, which for convenience of drawing is herein shown to be in a horizontal position, may be secured at any desired angle above or below that horizontal by means of the clamping-bolt 64, passing through an extension 65 of the cross feed-slide. The cutter-spindle is rotated by means of the pulley 66, driven by a belt from any convenient counter-shaft, and the spindle is arranged at a considerable angle with the axis of the work-spindle, as shown in Fig. 1, so as to enable the pulley thus to be mounted directly upon the cutter-spindle, and yet clear the foot-stock and the work. The general contour of the teeth of the cutter is made at a similar angle with the plane of the cutter, so as to bring the said contour into the desired relation to the work, and thus allow for the angular divergence of the spindle 60. This angular divergence should not exceed that of the side of the teeth to be milled, and should preferably be somewhat less in order to allow of the use of a cutter having its teeth somewhat inclined to the annular face of the cutter, so as to allow of a suitable peripheral clearance for the proper working of the teeth. For example, the machine herein illustrated is designed to mill the teeth of taps in accordance with the United States standard, the sides of which form an angle of sixty degrees with the axis of the tap. Therefore the spindle herein shown is represented as being at an angle $a$ of somewhat less than thirty degrees with the axis of the tap and work-spindle, so that the cutting-face upon the left-hand or front face of the cutter shall be at a slight angle $b$ with the annular face thereof, as shown in Fig. 15, thereby allowing of a slight peripheral clearance for the teeth on that face.

The cross feed-slide is fitted to slide transversely on the relieving-slide 70, and in order to enable the cutter to be accurately adjusted to depth an adjusting-screw 67 is provided between the relieving-slide and the cross feed-slide, as best shown in Fig. 5, the screw being provided with a knob 68, which is graduated to enable the operator to adjust the feed-slide to a definite or predetermined extent. The relieving-slide 70 is mounted upon the taper slide 71, provision being made for a slide movement upon the latter under the control of the relieving-cam 72, which is mounted upon the cam-shaft 73, carried by the taper slide. The contact between the relieving-slide and its cam 72 is preferably made by means of a roller 74, which is carried upon the slide, the latter being yieldingly held into engagement with the cam by means of the springs 75, which abut against a shoulder of the slide 71. The cam 72 is employed only when the distance between the cutter and the axis of the tap is to be changed during the rotation of the latter, or, in other words, when the peripheral contour of the cut is not to be a true circle. When a circular contour is desired, the cam 72 is not required, and the slide 70 may then be clamped to the slide 71, thus becoming practically integral therewith; but where the peripheral contour of the cut is to be other than a true circle—as, for example, to relieve the tap or to remove the alternate wings of the tap, as is desirable in some special forms thereof—the contour of the cam is shaped in accordance with the desired path of the cutter.

The taper slide 71 is mounted upon the carriage 24 and is moved transversely thereto during the operation of milling tapering portions of the tap, carrying the shaft 73 transversely with it, and thereby moving it out of alinement at such times with the connecting-shaft 40, by which it is driven. In order to allow for this relative lateral displacement of the two shafts, they are connected by means of a coupling 76, which is provided upon its opposite sides with driving abutments or ribs 77 and 78, arranged at substantially right angles to each other and engaging with corresponding transverse grooves in the adjacent faces of the disks 79 and 80, secured to the shafts 40 and 73, respectively. The right-hand end of the shaft 40 is journaled in the carriage 24 and moves longitudinally therewith, the opposite end of the shaft sliding through the splined sleeve 37, to which the driving-pinion 39 and the cam 38 are secured. The transverse movements of the taper slide 71 with relation to the carriage 24 are controlled by a guide-bar on the rearward side of the machine, comprising two or more members or sections 85 and 86, which are supported upon a bracket 87 and secured to the bed 20 by means of one or more clamping-bolts 88, as best shown in Fig. 5, so that it may readily be moved longitudinally of the bed to bring the different guide-bar sections or their joints into any desired relation longitudinally of the tap in accordance with the desired location of the tapers or other contours to be made thereon. In the arrangement herein shown the guide-bar 85 is fixed in parallel relation to the axis of the tap, so that the taper slide is not moved relative to the carriage while under the control of this section of the guide-bar. The bar 86 is herein shown to be swung at an angle to the line of movement of the carriage corresponding with the angle between the tapering side of the tap $t$ and the axis thereof, so that the taper slide when controlled by this section of the guide-bar is moved laterally thereby as it is moved along by the carriage, thus serving to impart the required taper to the tap. One side, as 90, of the guide-bars 85 and 86 is adopted as the controlling-surface, and the taper slide is provided with an abutment, preferably a roll 91, for engaging with that surface. The joints in the bar are located with their axes in the plane of the surface 90, so that the continuity of that surface is not broken by the angular adjustment of the bars upon their connecting-joints. The preferred construction and arrangement of the joints of the guide-bar are best shown in Figs. 7 to 11, inclusive. The bracket 87 is provided with a circular recess for receiving the segmental joint members 92 and 93, which project from the bar-sections 85 and 86, respectively, and may be attached thereto or be integral therewith; but for convenience in construction they are preferably made in separate pieces (best shown in Figs. 10 and 11) and are set in corresponding segmental recesses in the adjacent ends of their respective bar-sections, each segment being attached to its bar by means of screws and dowels. These segments are located in a concentric relation to the intersection of the guiding-surfaces 90 of the bars 85 and 86, so that when the segments are dropped into their circular recess in the bracket 87 the latter retains the ends of the bars in proper pivotal position while allowing them to swing freely, as upon a hinge. As a means for clamping the jointed ends of the bar in place they are provided with a clamp-bolt 94, which is located in the counterbored hole 95 concentric with the joint of the bars. This bolt extends downwardly from the bracket 87 and is provided with a clamping-nut 96, by means of which the joints are securely clamped. The outer ends of the bars may be provided with graduations to facilitate the setting of the bar, which may then be clamped to place by the bolt 97 and nut 98.

In order to cause the taper slide to accurately follow the controlling side 90 of the guide-bars and to prevent loss of movement through looseness or wear in the connections, a take-up device is provided comprising a slide 102, mounted on the slide 71 and abutting against the guide-bar, preferably by means of a roll 101, in a direction opposite to that of the abutment 91 of the slide 71, as shown in Figs. 1 and 5. The slide is provided with a spring 103, abutting against the slide 71, which serves to press the rolls firmly into contact with the opposite sides of the guide-bar. This arrangement also allows the rolls to separate slightly, as they must when engaging with an inclined guide-bar.

The tap-blanks are preferably fluted longitudinally to form the wings or "lands" of the tap before placing them in this machine. In the case of taps which are to be relieved or which require the employment of the cam 72 for this or any similar purpose it is obviously necessary to place the fluted blanks in the machine in a particular rotary relation to the relieving-cam 72. To this end provision is made, as illustrated in Fig. 6, for locking the said cam at a definite and uniform rotary position while the successive blanks are being inserted in the chuck. The blanks are similarly set to a uniform rotary position by means of a gage 106, which is held in a chuck 107, fitted upon a bar 108, which extends from a boss 109 on the foot-stock 22, the bar being clamped in the boss with sufficient friction to retain it where it is placed. The gage 106 is adjustable lengthwise in its chuck, and the latter is adjustable longitudinally in the boss by means of its bar 108. During the setting operation the cam-shaft 40 is locked in position against rotary movement by means of the latch 110, which is pivotally mounted upon the carriage so as to engage with a notch 111 in the edge of the disk 79. In setting the tap to position it is turned until the face of one of its wings rests against the end of the gage. The chuck is then gripped tightly upon the shank of the tap, after which the gage is swung up out of the way until required for the setting of the next tap. The latch 110 when arranged as shown need not be swung out of place by the operator, as it will be carried out by the rotary movement of the disk 79 when the latter is started.

In milling taps of ordinary length and construction the outer end is supported by means of a dead-center 114, which is mounted in the foot-stock 22 and which is moved by means of its adjusting-screw 115, being clamped to place after adjustment in any convenient way. Where it is desired to mill stay-bolt and similar taps having an extended shank or reamer portion, the center 114 may be removed and a bushing substituted for encircling and supporting the tap as close as possible to the milling-cutter. For long taps it is sometimes desirable to employ the back-rest 118, (shown in Fig. 6,) which extends from and is clamped in the hub 119 on the foot-stock 22. This construction allows the back-rest to be adjusted to any desired position longitudinally of the tap and to be swung into and out of operative position.

In order to facilitate the operations of the machine, the carriage 24 is connected with its lead-screw 51 by means of a divided nut, which may be readily disconnected by the operator and by means of which the carriage may also be readily adjusted longitudinally of the bed, so as to bring the cutter into accurate register with the teeth of the tap when it is desired to reset a tap that has been partly cut or for any other reason. This device, as best shown in Figs. 12, 13, and 14, consists of a casing 121, which is mounted upon the carriage 24 and is adjustable thereon longitudinally of the lead-screw by means of the screw 122, being clamped to its desired position by means of the clamp-screw 123. The casing extends downwardly and encompasses the lead-screw 51 and forms a bearing for the nut, which consists of the two parts 124 and 125, which are adjusted in the casing 121 toward and from each other sufficiently to enable them to be connected with and disconnected from the lead-screw 51 by means of the screw 126, the end of which is journaled in the upper half-nut 125, while the threaded portion passes through a nut 127, attached to the lower half-nut 124. These nuts are free to move or "float" vertically, the downward movement of the lower nut being stopped by its contact with the bottom of the casing at 128, while the upward movement of the upper nut is limited by the heads of the screws 129, which project into the pathway of the half-nut 125. Thus either half of the nut when it reaches the limit of its movement reacts upon the other half until both are moved against their respective stops and are thus clear of the threads of the lead-screw. A cover 130 is preferably attached to the casing in order to exclude dirt from the half-nuts.

The operation of the machine is as follows: Assuming it to be set to milling the five-winged right-handed tap shown in the figures, in which case the cams 38 and 72 are geared to make five rotations while the work-spindle makes one, the carriage is disconnected from the lead-screw by means of the screw 126 and is moved along the the bed by means of the hand-wheel 56 far enough to bring the cutter clear of the right-hand end of the blank, which is then inserted in the chuck 26. The main spindle is rotated far enough to bring the disk 79 to the position shown in Fig. 6, so as to enable the latch 110 to be thrown into the notch 111, thus locking the cam-shaft. The gage having been previously set to the required position is then swung down, and the tap-blank is turned so as to bring the face of one of its wings up against the end of the gage, as shown in Fig. 6, and is gripped in this position, the wings being thus established in correct relation to the relieving-cam 72. The setting-gage 106 is then swung out of the way, the dead-center or other means for supporting the outward end of the tap is adjusted to position, and the back-rest 118, if required, is adjusted to place. The carriage is then moved by hand far enough to bring the cutter almost into contact with the work. The divided nuts are then closed upon the lead-screw, the countershaft or other driving means is set in motion, and the cutter begins its work upon the tap, which is rotated slowly by the pulley 36 while the cutter is operating upon the wings, so as to impart to the tap a suitable feeding movement. As the cutter finishes the wing the clutch 30 is moved by the clutch-cam 38 into engagement with the faster-traveling pulley 31, which accelerates the tap through the succeeding interval between the wings, so as to bring the next wing quickly into engagement with the cutter, upon which the clutch 30 is moved by the cam 38 again into engagement with the slow-driving disk 32, thus completing the cycle of speed changes. This cycle is repeated for each wing and interval of the tap, and the cutter thus works its way along its spiral path across the succeeding wings of the tap until it reaches the end, when the completed tap is removed and another blank is inserted, as before. The adjustment of the cutter by means of its feed-slide 62 and of the taper guide-bars will be already understood from the description hereinbefore given, and after they are once set for a given size and style of tap it will ordinarily be unnecessary to readjust them, excepting when the cutter is reground.

The sections 85 and 86 of the guide-bar may either be straight, as herein shown, or they may be curved in any desired contour. Any desired number of these bars, both straight and curved, may also be connected as herein shown.

An important advantage resides in the multiple relation borne by the rotations of the clutch-cam 38 and the relieving-cam 72 to one rotation of the work-spindle 25, inasmuch as the desired successions, series, or cycle of movement desired for each wing or lobe of the work may be laid out or arranged entirely around the circle or periphery of the cams, which when geared in the proper multiple relation to the main spindle will repeat its effect with perfect accuracy upon each of the wings or lobes of the work. A further advantage arises from the circumstance that the number of these lobes or wings may be increased or diminished at will by suitably changing the multiple ratio of the gearing between the work-spindle and the cams.

I claim as my invention—

1. The combination of a rotating work-carrying spindle, means for imparting changed speeds to the said spindle, and a cam for controlling the speed-changing means, shaped to produce a complete cycle of changes of speed of the work-spindle at each rotation of the cam.

2. The combination of a rotating work-carrying spindle, a cam, geared to make a plurality of rotations for each rotation of the work-spindle and means controlled by the said cam for successively applying a cycle of differing rotative speeds to the work-spindle, at each rotation of the cam.

3. The combination of a rotating work-carrying spindle, a cam and means controlled thereby for imparting a cycle of different rotative speeds to the work-spindle and change-gearing intermediate the spindle and the cam, for changing their ratios of rotation.

4. The combination of a rotating work-carrying spindle, a plurality of driving devices for imparting different rates of speed to the said spindle, a clutch for making the driving connection between the spindle and either of said driving devices, a rotating cam for operating the clutch to produce the required cycle of changes, and change-gearing intermediate the work-spindle and the cam for changing their ratios of rotation.

5. In a machine of the class specified, in combination with means for supporting and rotating a tap at different speeds, a tool-slide movable laterally of the tap, a cam geared to make a complete rotation for each wing and interval of the tap, and arranged to impart the required lateral movements of the slide.

6. In a machine of the class specified, the combination of means for supporting and rotating a tap at different speeds, a tool-slide arranged to move laterally of the tap, a cam for imparting and repeating the required lateral movements of the slide at each wing of the tap, a cam for controlling the changes of speed in the tap-rotating devices, and gearing for imparting a plurality of rotations to the cams, for each rotation of the tap, corresponding with the number of wings therein.

7. A jointed guide-bar having the axis of its joint coincident with the intersection of the guiding-surface of the bar.

8. In combination with the members of a jointed guide-bar, segmental joint members having a common axis which is coincident with the intersection of the guide-faces of the bar members.

9. In combination with the members of a jointed guide-bar, each member being provided with a segmental joint member having a common axis located in coincidence with the intersections of the guide-face of the bar, a bracket provided with a circular recess for receiving the said segmental members, and thereby maintaining the bar members in their proper hinged relation.

10. A jointed guide-bar having a segmental recess in each of the adjacent ends of the joined members, the recesses being concentric with the intersection of the guiding-faces of the bar, and a bracket provided with a circular recess for receiving the said segmental members, and thereby maintaining the bar members in their proper hinged relation.

11. In combination with an angularly-adjustable guide-bar, a tool-carriage having an abutment bearing against a guiding-surface of the bar, and a resiliently-yielding take-up, movable with the carriage, and bearing against the bar, to prevent lost motion and to allow of the angular adjustment of the bar.

12. In combination with a jointed and angularly-adjustable guide-bar, a tool-carriage having an abutment bearing against the guiding-surface of the bar, and a resiliently-yielding take-up movable with the carriage, and bearing against the bar, permitting of the adjustment of the different members of the bar, to different angular positions, and to prevent lost motion between the guide-bar and the tool-carriage.

13. In combination with a jointed, angularly-adjustable guide-bar, a tool-carriage having an abutment bearing against the guiding-surface of the bar, a take-up mounted on the tool-carriage, and means, as a spring, for resiliently pressing the take-up against the bar.

14. In combination with a guide-bar having members adjustable to different angular positions, a tool-slide having an abutment for bearing in one direction against the bar, and having a yielding abutment for bearing in the opposite direction against the bar, whereby the slide is adapted to follow the angles and sinuosities of the bar, without lost motion.

15. In combination with a movable carriage and a lead-screw therefor, a casing mounted upon the carriage and adjustable thereon, longitudinally of the lead-screw, a screw for thus adjusting the casing, a divided nut consisting of two sections mounted in the casing and movable transversely of the lead-screw, and a screw mounted upon and carried with the nut-sections for opening and closing them upon the lead-screw.

16. A divided-nut device for lead-screws comprising a casing encompassing the lead-screw, divided nut-sections mounted in the casing, and a screw, journaled on and connecting the nut-sections independently of the casing.

17. In combination with a movable carriage, and a lead-screw therefor, a casing mounted upon the carriage and adjustable longitudinally of the feed-screw, means for thus adjusting the casing and for clamping it in its adjusted positions, divided nut-sections mounted in the casing, and a screw journaled on and connecting the nut-sections independently of the casing.

18. In a machine of the class specified, in combination with the main spindle, and a cam operatively connected therewith, means for locking the cam-shaft at a predetermined position, and an adjustable gage for determining the correct setting of the work in proper relation to the cam-shaft.

19. In a machine of the class specified, in combination with the work-spindle, a cam operatively connected therewith, a latch for locking the cam at a predetermined relative position, an adjustable gage for locating a wing of the work in proper rotary relation to the locked cam, and a supporting-bar for the gage, mounted for adjustment, relative to the work.

Signed at Hartford, Connecticut, this 8th day of November, 1900.

B. M. W. HANSON.

Witnesses:
CARRIE M. BRECKLE,
WM. H. HONISS.